(12) United States Patent
Rudnisky

(10) Patent No.: US 12,436,273 B2
(45) Date of Patent: Oct. 7, 2025

(54) SYSTEMS AND METHODS FOR SCHEDULING RADAR SCAN PATTERNS IN A VEHICULAR RADAR SYSTEM

(71) Applicant: Deere & Company, Moline, IL (US)

(72) Inventor: William John Rudnisky, Harbor City, CA (US)

(73) Assignee: Deere & Company, Moline, IL (US)

( * ) Notice: Subject to any disclaimer, the term of this patent is extended or adjusted under 35 U.S.C. 154(b) by 408 days.

(21) Appl. No.: 17/973,382

(22) Filed: Oct. 25, 2022

(65) Prior Publication Data

US 2024/0103160 A1    Mar. 28, 2024

Related U.S. Application Data

(63) Continuation-in-part of application No. 17/954,566, filed on Sep. 28, 2022.

(51) Int. Cl.
*G01S 13/931* (2020.01)

(52) U.S. Cl.
CPC .................................. *G01S 13/931* (2013.01)

(58) Field of Classification Search
CPC ...... G01S 13/931; G01S 13/726; G01S 13/72; G01S 2013/0254; G01S 7/417; G01S 7/41; G05D 1/0257; H01Q 1/3233; H01Q 1/247; H01Q 3/005; H01Q 3/10; H01Q 3/242; H01Q 3/385
USPC ........................................... 342/70; 702/159
See application file for complete search history.

(56) References Cited

U.S. PATENT DOCUMENTS

| | | | | |
|---|---|---|---|---|
| 4,720,711 A | * | 1/1988 | Quesinberry | G01S 13/72 342/96 |
| 5,508,706 A | * | 4/1996 | Tsou | G01S 7/032 342/192 |
| 6,021,333 A | * | 2/2000 | Anderson | H04W 72/20 455/560 |
| 6,891,496 B2 | * | 5/2005 | Husted | H04K 3/822 342/159 |
| 7,196,656 B2 | | 3/2007 | Shirakawa | |
| 7,724,180 B2 | | 5/2010 | Yonak et al. | |
| 8,922,419 B2 | * | 12/2014 | Rudnisky | H04K 3/41 342/195 |
| 9,733,348 B2 | * | 8/2017 | Gazit | G01S 7/403 |
| 9,785,042 B2 | | 10/2017 | Fujita et al. | |
| 10,054,661 B1 | * | 8/2018 | Rai | G01S 3/023 |
| 10,291,755 B2 | * | 5/2019 | Knaappila | H04W 8/005 |

(Continued)

*Primary Examiner* — Michael W Justice

(74) *Attorney, Agent, or Firm* — Gary L. Montle; Lucian Wayne Beavers; Patterson Intellectual Property Law, PC

(57) ABSTRACT

Systems and methods are provided for controlling a vehicular radar system by selecting a radar scan pattern to be used by the vehicular radar system. The vehicular radar system can generate numerous different radar scan patterns to be used by the radar system to gather additional information about the objects in the environment. The vehicular radar system can incorporate a scheduler to adjudicate between the numerous generated radar scan patterns to determine the radar scan pattern that is implemented by the vehicular radar system. The scheduler can determine the radar scan pattern to be implemented by the vehicular radar system by prioritizing and ranking the different radar scan patterns. The radar scan pattern having the highest priority and ranking can then be implemented by the vehicular radar system.

14 Claims, 9 Drawing Sheets

(56) References Cited

U.S. PATENT DOCUMENTS

| | | | |
|---|---|---|---|
| 10,436,888 B2* | 10/2019 | Li | G01S 13/886 |
| 10,599,154 B2* | 3/2020 | Dean | G05D 1/646 |
| 10,795,014 B2 | 10/2020 | Shan | |
| 10,823,838 B2 | 11/2020 | Billaud | |
| 10,983,204 B2* | 4/2021 | Kim | G01S 13/34 |
| 11,209,534 B2* | 12/2021 | Leabman | A61B 5/021 |
| 11,327,167 B2 | 5/2022 | Vaishnav et al. | |
| 11,360,188 B2 | 6/2022 | Leabman | |
| 11,366,197 B2 | 6/2022 | Leabman | |
| 11,487,002 B2 | 11/2022 | Matsuda et al. | |
| 11,606,492 B2* | 3/2023 | Camacho | H04N 23/69 |
| 11,611,707 B2* | 3/2023 | Camacho | H04N 23/695 |
| 11,698,452 B2* | 7/2023 | Bialer | G01S 13/723 |
| | | | 342/71 |
| 11,802,954 B2 | 10/2023 | Anno et al. | |
| 11,844,122 B2 | 12/2023 | Kumari et al. | |
| 11,867,789 B2* | 1/2024 | Sudarsan | G01S 13/931 |
| 11,921,233 B2 | 3/2024 | Frank et al. | |
| 2003/0206130 A1* | 11/2003 | Husted | H04W 16/14 |
| | | | 342/159 |
| 2006/0066474 A1* | 3/2006 | Shirakawa | G01S 13/424 |
| | | | 342/155 |
| 2008/0129581 A1 | 6/2008 | Douglass et al. | |
| 2008/0266169 A1 | 10/2008 | Akita | |
| 2008/0272955 A1 | 11/2008 | Yonak et al. | |
| 2014/0159934 A1* | 6/2014 | Rudnisky | H04K 3/00 |
| | | | 342/14 |
| 2016/0047907 A1* | 2/2016 | Izadian | H01Q 3/2605 |
| | | | 342/368 |
| 2017/0255093 A1 | 9/2017 | Fujita et al. | |
| 2019/0020741 A1* | 1/2019 | Knaappila | H04W 4/80 |
| 2019/0033439 A1* | 1/2019 | Gu | G01S 7/415 |
| 2019/0049977 A1* | 2/2019 | Dean | G05D 1/0244 |
| 2019/0072659 A1* | 3/2019 | Gu | G01S 13/42 |
| 2019/0146078 A1 | 5/2019 | Billaud | |
| 2019/0187276 A1* | 6/2019 | Matsuda | G01C 3/08 |
| 2019/0219685 A1* | 7/2019 | Shan | G01S 13/89 |
| 2019/0271765 A1 | 9/2019 | Ben et al. | |
| 2019/0285743 A1 | 9/2019 | Kaino | |
| 2019/0356060 A1* | 11/2019 | Daniel | H01Q 3/44 |
| 2019/0361105 A1* | 11/2019 | Kim | G01S 13/343 |
| 2020/0036487 A1 | 1/2020 | Hammond et al. | |
| 2020/0103498 A1* | 4/2020 | Frank | G01S 7/411 |
| 2020/0191932 A1 | 6/2020 | Leabman | |
| 2020/0191944 A1 | 6/2020 | Leabman | |
| 2020/0191945 A1* | 6/2020 | Leabman | G01S 7/282 |
| 2021/0080557 A1* | 3/2021 | Vaishnav | G01S 13/72 |
| 2021/0106234 A1 | 4/2021 | Leabman | |
| 2021/0247509 A1* | 8/2021 | Anno | G01S 13/584 |
| 2021/0255298 A1 | 8/2021 | Leabman | |
| 2021/0255299 A1 | 8/2021 | Leabman | |
| 2021/0302570 A1* | 9/2021 | Ichiki | G01S 7/41 |
| 2021/0364628 A1 | 11/2021 | Leabman | |
| 2022/0018954 A1* | 1/2022 | Santucci | H01Q 15/14 |
| 2022/0095151 A1* | 3/2022 | Zhang | G01S 7/0236 |
| 2022/0187441 A1* | 6/2022 | Bialer | G01S 13/62 |
| 2022/0377232 A1* | 11/2022 | Camacho | H04N 23/67 |
| 2022/0377242 A1* | 11/2022 | Camacho | H04N 23/61 |
| 2023/0043235 A1* | 2/2023 | Kumari | H04B 7/0617 |
| 2023/0168351 A1* | 6/2023 | O'Donnell | B60W 30/182 |
| | | | 702/159 |
| 2023/0239772 A1* | 7/2023 | Deng | H04W 72/542 |
| | | | 370/252 |
| 2023/0408675 A1* | 12/2023 | Chang | G01S 13/584 |
| 2024/0015495 A1* | 1/2024 | Feng | H04W 8/005 |

\* cited by examiner

SYSTEMS AND METHODS FOR SCHEDULING RADAR SCAN PATTERNS IN A VEHICULAR RADAR SYSTEM

CROSS-REFERENCE TO RELATED APPLICATIONS

This application is a continuation-in-part of U.S. patent application Ser. No. 17/954,566, filed Sep. 28, 2022, and entitled "Systems and Methods for Controlling the Operation of a Vehicular Radar System," which application is hereby incorporated by reference in its entirety.

BACKGROUND

The present application generally relates to controlling radar systems. More specifically, the present application is directed to systems and methods for controlling the operation of a vehicular radar system by scheduling the appropriate radar scan pattern from among several radar scan patterns to be executed.

Radar systems have been incorporated in many vehicles to aid in safe operation and navigation of the vehicle by sensing the surrounding environment of a vehicle. Generally, the vehicular radar systems include one or more transmitters that send out electromagnetic waves and one or more receivers that detect the returning waves after they encounter an object in the environment. The radar system can then process the signals associated with the returning waves to generate information (e.g., position and velocity relative to the vehicle) about the detected object. The generated information about the detected object can then be used to control the operation of the vehicle. For example, upon detecting an object within the trajectory of the vehicle, the radar system (or other vehicle control system) may alert the driver or pilot of the vehicle, perform evasive or remedial actions to avoid a collision (e.g., apply brakes or turn vehicle), or a combination of the previous actions or other types actions to maintain safe operation of the vehicle.

Typically, vehicular radar systems are "open-loop" systems that repeat the same scan pattern of electromagnetic waves for as long as the radar system is in operation. For example, a radar scan pattern used by the vehicular radar system may include one or more short range scans (using a first waveform) followed by one or more long range scans (using a second waveform). The iterative use of the single radar scan pattern by the vehicular radar system can be useful for the general purpose of locating objects near the vehicle. However, depending on the use of the generated information about the detected object, the iterative use of the single radar scan pattern by the vehicular radar system may not provide sufficient information to appropriately determine subsequent actions. For example, if a vehicular radar system using a single scan pattern is incorporated in an autonomous vehicle, the generated information about a detected object may not be sufficient for the autonomous vehicle to determine the best course of action in response to the detected object. Thus, what is needed is a way to adapt the radar scan pattern of a vehicular radar system to the surrounding environment and then select or schedule one of the newly adapted radar scan patterns to be implemented by the vehicular radar system.

SUMMARY

The present application is directed to systems and methods for controlling the operation of a vehicular radar system. The vehicular radar system can incorporate a "feedback loop" that permits the radar system to autonomously adapt to the environment surrounding the vehicle. The vehicular radar system can use artificial intelligence (AI) (including, but not limited to, machine learning, neural networks, deep learning and computer vision) to augment the ability of the radar system to make decisions about the best possible next waveform(s) or area to be scanned by the radar system. The vehicular radar system can generate different radar scan patterns that can incorporate different waveforms by making inferences about the environment surrounding the vehicle. Once the different radar scan patterns have been generated, the vehicular radar system can select or schedule a particular radar scan pattern from the many generated radar scan patterns to be implemented by the vehicular radar system.

The vehicular radar system can change the properties (e.g., frequency, pulse width, chirp frequency and/or number of pulses) of the waveforms emitted by the radar system to extract particular information and/or parameters associated with objects in the environment that have been detected by the radar system. In addition, the vehicular radar system can generate nuanced data products (e.g., inferences about detected objects) from the "raw" data received by the radar system. The nuanced data products can then be evaluated using the AI of the vehicular radar system to determine the properties of the waveforms to be emitted by the vehicular radar system. For example, when an object suddenly enters the trajectory of a vehicle, the vehicular radar system can focus on the object and optimize the radar scan (or collection) pattern to get additional relevant information about the object. The waveforms emitted by the vehicular radar system can be adapted to optimize the signal-to-noise ratio (SNR) or select parameters to be able to extract additional information about the object. For example, the waveforms can be adapted to extract additional information (e.g., higher resolution information or data) relating to the object's range or distance from the vehicle, velocity (or information related to the vehicle's closing speed with respect to the object) and/or angular position. The vehicular radar system can continue to collect information about the object, as described above, until a desired amount of information is collected (e.g., the collection of further information will not yield additional information of significance about the object) or the object moves away from the vehicle. After that, the vehicle radar system can return to "normal" operation in which the radar system uses predefined radar scan patterns to detect for objects and/or possible collision events.

Once the different radar scan patterns have been generated, the vehicular radar system can use a scheduler to select one of the radar scan patterns for execution. The scheduler can adjudicate between the numerous generated radar scan patterns to determine the radar scan pattern that is implemented by the vehicular radar system. The scheduler can determine the radar scan pattern to be implemented by the vehicular radar system by prioritizing and ranking the different radar scan patterns. The radar scan pattern having the highest priority and ranking can then be implemented by the vehicular radar system. For example, the scheduler can incorporate different queues or lists having different priorities for the radar scan patterns. As radar scan patterns are received by the scheduler, the scheduler can place the radar scan pattern into the appropriate queue having the appropriate priority for the radar scan pattern. Within each queue or list, the radar scan patterns can be further ordered or ranked. The scheduler can then select the highest ranked radar scan pattern from the queue having the highest precedence for execution by the vehicular radar system.

One advantage of the present application is that the vehicular radar system can dynamically respond to changes in the environment around the vehicle.

Another advantage of the present application is that the emitted waveforms from the vehicular radar system can be adapted to collect detailed information about an object.

Still another advantage of the present application is the ability to select a set of waveforms, from several different sets of waveforms, to be implemented by the vehicular radar system.

Other features and advantages of the present application will be apparent from the following more detailed description of the identified embodiments, taken in conjunction with the accompanying drawings which show, by way of example, the principles of the application.

BRIEF DESCRIPTION OF THE DRAWINGS

Wherever possible, the same reference numbers are used throughout the drawings to refer to the same or like parts.

DETAILED DESCRIPTION

Figure 1:
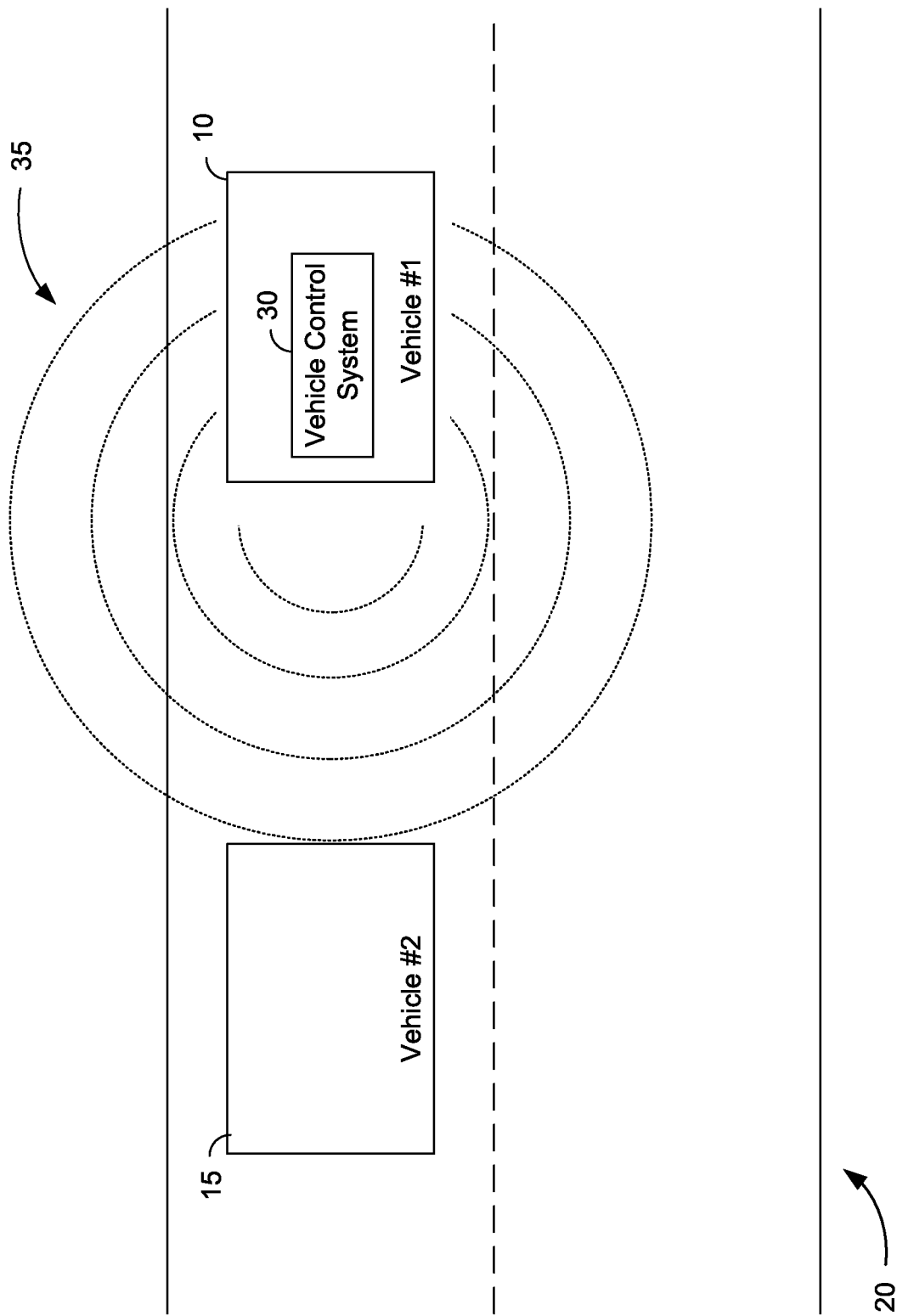
FIG. 1 is a schematic diagram showing a vehicle with a vehicle control system in use on a road.

FIG. 1 shows an embodiment of a vehicle with a vehicular control system in use on a road. As shown in FIG. 1, a first vehicle 10 and a second vehicle 15 are travelling on a road 20. The first vehicle 10 includes a vehicle control system 30 that includes several devices and/or systems that can be used to detect objects in the vicinity of the first vehicle 10 (such as the second vehicle 15) and/or to control operation of the first vehicle 10. For example, the vehicle control system 30 can incorporate a radar system 50 (see FIG. 2) that emits electromagnetic waves (e.g., radio waves) 35 that can be used to detect objects (e.g., the second vehicle 15) that are near the first vehicle 10. The first vehicle 10 can then use the information provided by the vehicle control system 30 to control the operation of the (first) vehicle 10.

Figure 2:
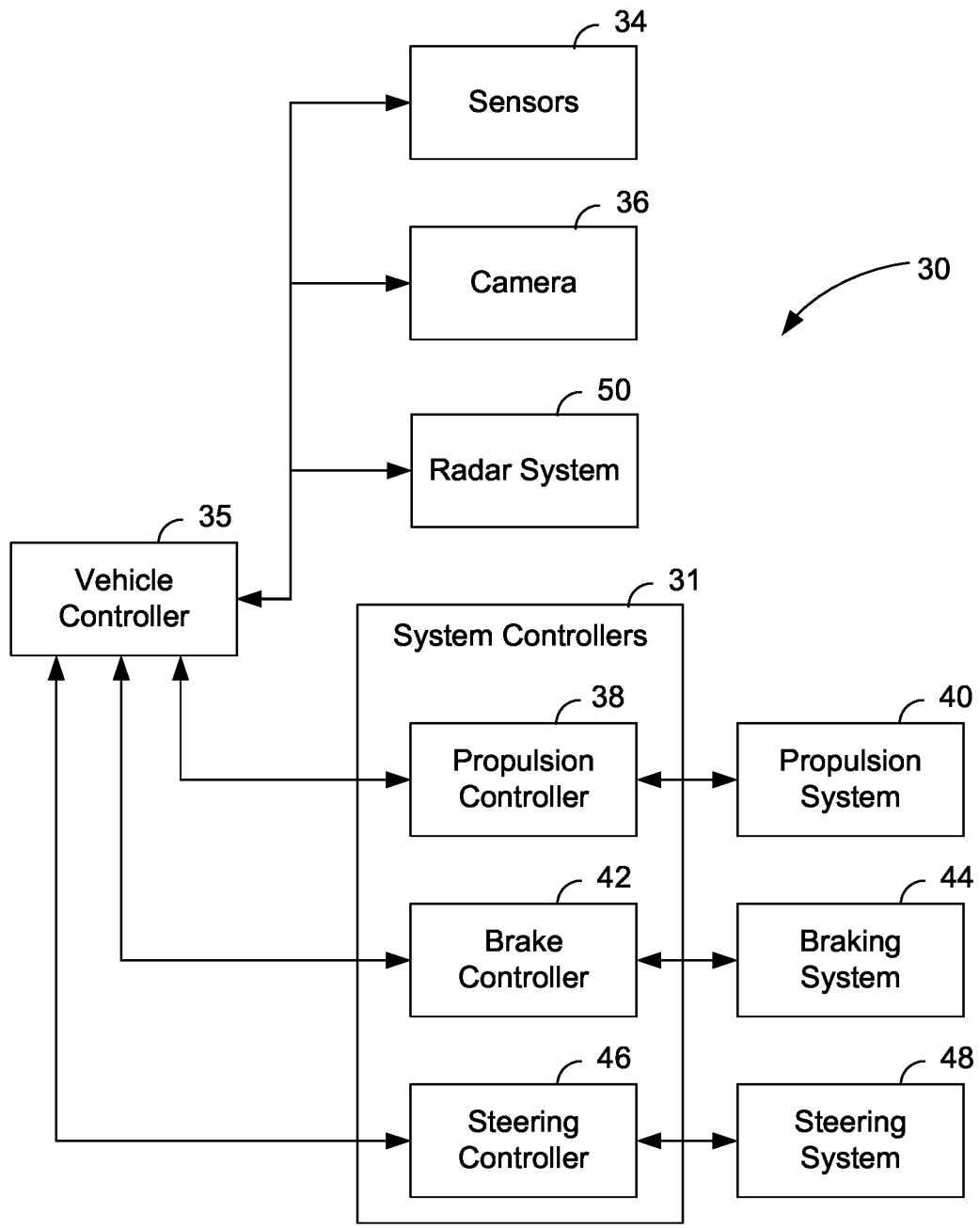
FIG. 2 is a block diagram showing an embodiment of the vehicle control system from FIG. 1.

FIG. 2 shows an embodiment of the vehicle control system 30. The vehicle control system 30 can include a vehicle controller 35. The vehicle controller 35 may receive information regarding the vehicle's environment, operation, location, and/or other parameters from vehicle system controllers 31, sensors 34, cameras 36, and radar system 50. The vehicle system controllers 31 can include one or more propulsion controllers 38 for managing the operation of and communicating with the propulsion system 40 for the vehicle 10 (e.g., an internal combustion engine or electric motor(s)), one or more brake controllers 42 for managing the operation of and communicating with the braking system 44, and one or more steering controllers 46 for managing the operation of and communicating with the steering system 48. Vehicle controller 35 can also communicate with one or more cameras 36, one or more sensors 34, and the radar system 50 to collect information to make an assessment of the vehicle's position and the surrounding environment. The cameras 36 can be used to collect information related to the vehicle's environment and location, and may rely on visual identification and interpretation of the vehicle's exterior environment. Cameras 36 may operate with or without other sensors 34 or the radar system 50 to provide environmental and vehicular information. For example, a camera 36 may visually detect the boundaries of a lane on the road 20 in which the vehicle 10 is traveling, while the radar system 50 detects the presence of an object (e.g., the second vehicle 15) within the trajectory of the vehicle 10 in the lane. The information provided by both the cameras 36 and the radar system 50 may be provided to the vehicle controller 35 to be interpreted and used to control the operation (e.g., to control the velocity) of the vehicle 10. In addition, sensors 34 can be used to collect information regarding the vehicle's position and the surrounding environment. In an embodiment, the sensors 34 can include, but are not limited to, accelerometers, tachometers, speedometers, global positioning systems (GPS), light detecting and ranging (LIDAR) systems, temperature sensors, emission sensors, pressure sensors, and fluid level sensors.

The vehicle controller 35 can communicate with vehicle system controllers 31 to receive information about vehicle operations and to direct the corresponding systems which are controlled by vehicle system controllers 31. For example, the vehicle controller 35 may direct the propulsion controller 38 to alter operations of propulsion system 40 (e.g., thrust generated by the propulsion system 40), the brake controller 42 to initiate, stop, or change the operation of braking system 44, or the steering controller 46 to alter the direction of travel of the vehicle using the steering system 48. In some embodiments, the vehicle controller 35 can direct more than one system to alter vehicle operations simultaneously or otherwise.

Figure 3:
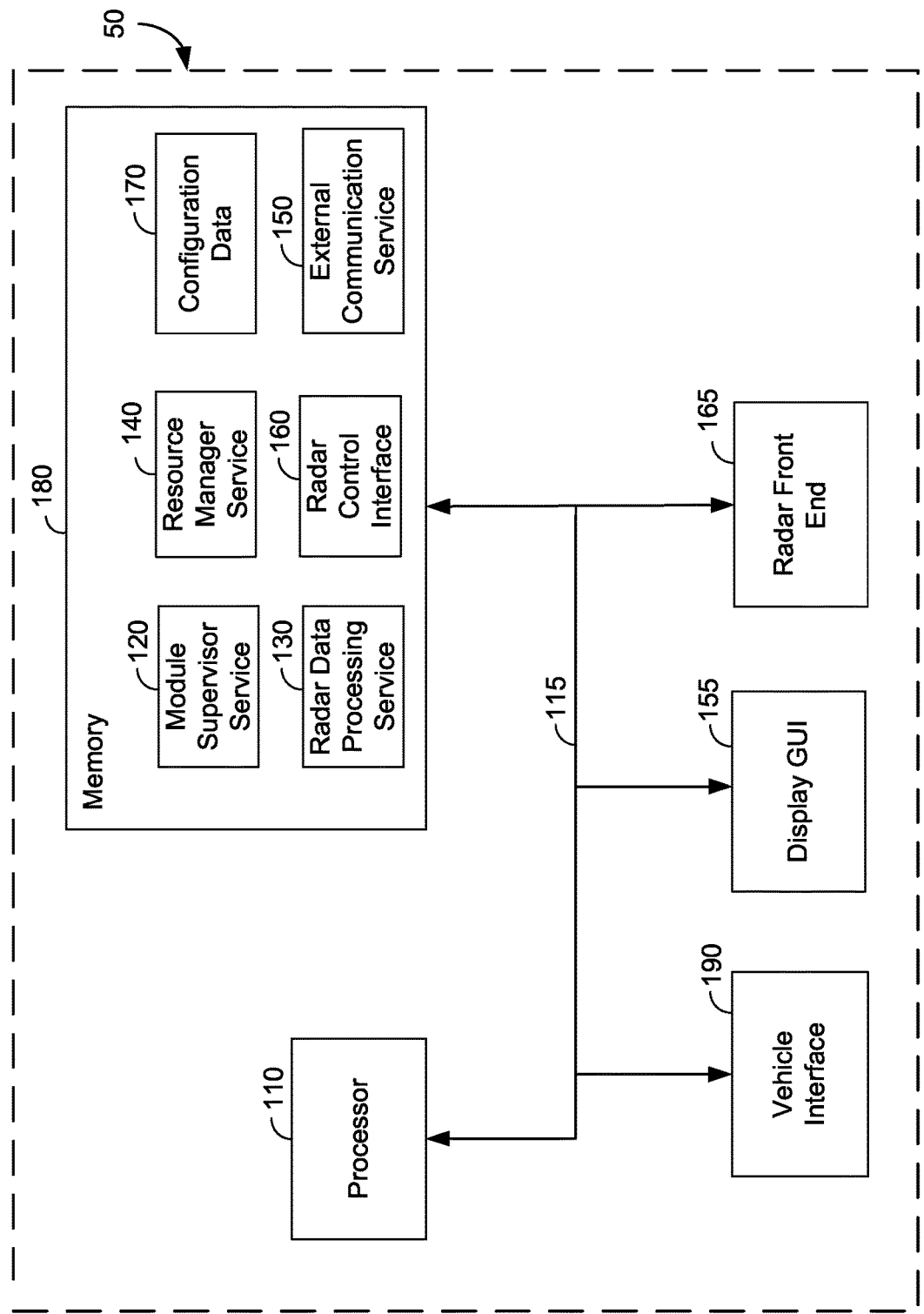
FIGS. 3 and 4 are block diagrams showing an embodiment of the radar system from the vehicle control system of FIG. 2.
Figure 4:
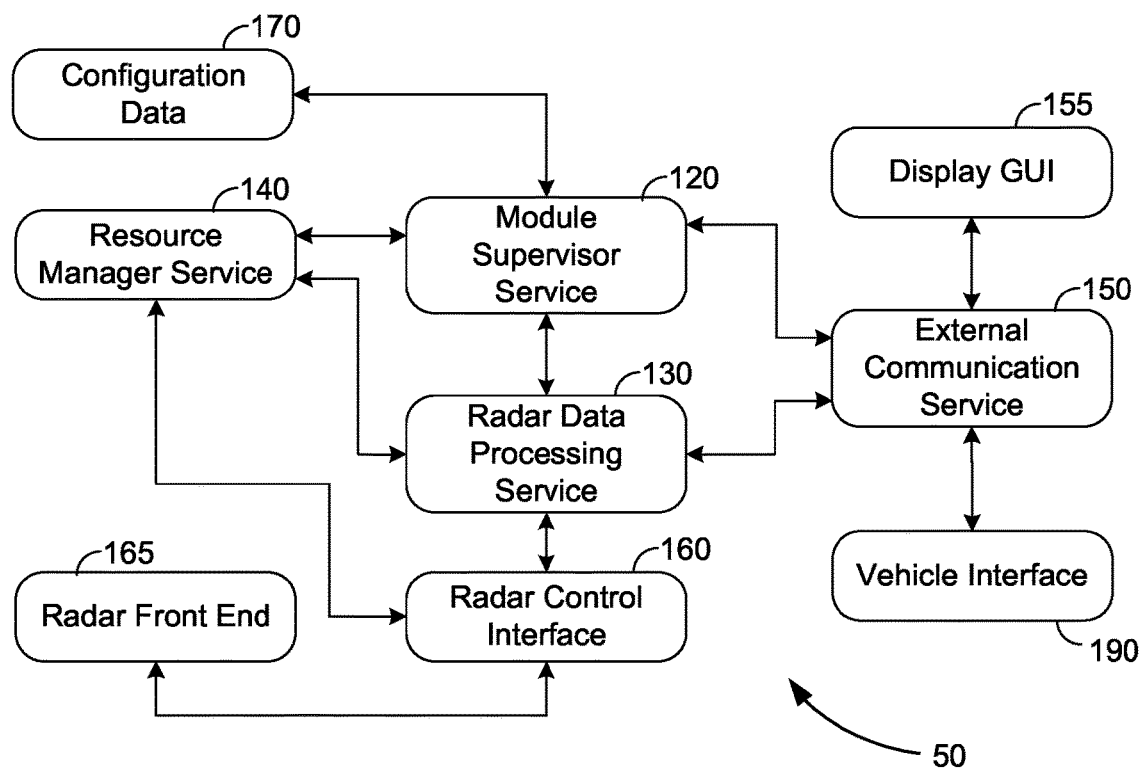

FIGS. 3 and 4 show an embodiment of the radar system 50 from the vehicle control system 30. The radar system 50 shown by FIG. 3 can include logic 120, referred to herein as "the module supervisor service" or "the mode controller," for generally controlling the operation of the radar system 50. The radar system 50 also includes logic 130, referred to herein as "the radar data processing service" or "the data services system," logic 140, referred to herein as "the resource manager service," logic 150, referred to herein as "the external communication service" or "the messaging system," and logic 160, referred to herein as "the radar control interface" or "the radar common interface." The radar data processing service 130 can be used to infer information about the environment (or 3D vector space) based on information received from a radar front end 165

(via the radar control interface 160 as shown in FIG. 4). The resource manager service 140 can be used to optimize the usage of the radar front end 165 (via the radar control interface 160) based on information from the module supervisor service 120. The external communication service 150 can be used to manage external communications to and from the radar system 50. The radar control interface 160 can be used to control the operation of the radar front end 165 and/or manage the data received from the radar front end 165. In other embodiments, the radar data processing service 130, the resource manager service 140, the external communication service 150 and/or the radar control interface 160 can be combined with the module supervisor service 120 or with one another. The module supervisor service 120, the radar data processing service 130, the resource manager service 140, the external communication service 150 and the radar control interface 160 may be implemented in software, firmware, hardware, or any combination thereof. In FIG. 3, the module supervisor service 120, the radar data processing service 130, the resource manager service 140, the external communication service 150 and the radar control interface 160 are implemented in software and stored in memory 180. However, other configurations of the module supervisor service 120, the radar data processing service 130, the resource manager service 140, the external communication service 150 and the radar control interface 160 are possible in other embodiments.

Note that the module supervisor service 120, the radar data processing service 130, the resource manager service 140, the external communication service 150 and the radar control interface 160, when implemented in software, can be stored and transported on any computer-readable medium for use by or in connection with an instruction execution apparatus that can fetch and execute instructions. In the context of this document, a "computer-readable medium" can be any non-transitory means that can contain or store code for use by or in connection with the instruction execution apparatus.

The radar system 50 may include at least one conventional processor 110, which includes processing hardware for executing instructions stored in the memory 180. As an example, the processor 110 may include a central processing unit (CPU) or a digital signal processor (DSP). The processor 110 communicates to and drives the other elements within the radar system 50 via a local interface 115, which can include at least one bus. When the module supervisor service 120, the radar data processing service 130, the resource manager service 140, the external communication service 150 and the radar control interface 160 are implemented in software, the processor 110 may execute instructions of the module supervisor service 120, the radar data processing service 130, the resource manager service 140, the external communication service 150 and the radar control interface 160 to perform the functions ascribed herein to the corresponding components.

The radar system 50 can include configuration data 170 that has information regarding the operation and capabilities of the radar system 50. In addition, the radar system 50 can include a vehicle interface 190 (e.g., data ports) for connecting the radar system 50 to the vehicle controller 35 (see FIG. 2) and a display GUI (graphical user interface) 155 that permits the radar system 50 to provide information to a user directly via a display in the vehicle 10. In an embodiment, the module supervisor service 120 of the radar system 50 can be used to manage process execution in the radar system 50 and control operation of the radar system 50 and the corresponding components of the radar system 50. The module supervisor service 120 can communicate with (i.e., send and receive information, data, messages, commands, etc.) with the radar data processing service 130, the resource manager service 140, the external communication service 150 and the configuration data 170. The radar control interface 160 can facilitate control of the operation of the radar front end 165 by the module supervisor service 120. The external communication service 150 can facilitate communication between the module supervisor service 120 and the display GUI 155 or the vehicle interface 190.

Figure 5:
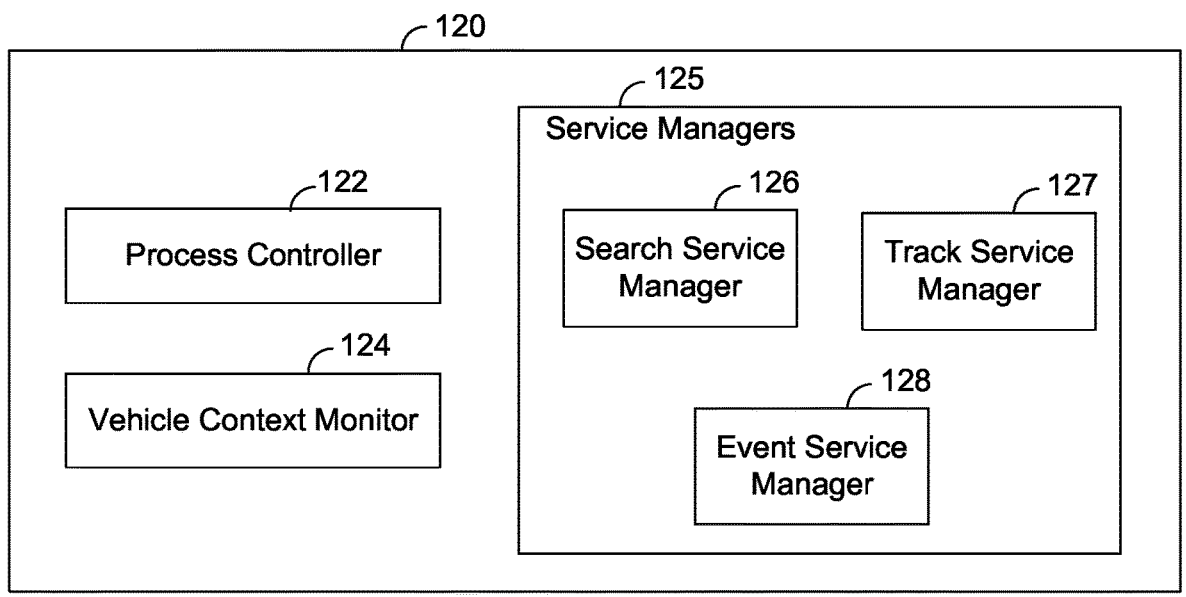
FIG. 5 is a block diagram showing an embodiment of the module supervisor service from the radar system of FIG. 3.

FIG. 5 is a block diagram showing an embodiment of the module supervisor service 120. The module supervisor service 120 can manage process execution in the radar system 50 and can control the radar front end 165. The module supervisor service 120 can include a process controller 122 that can be used to control the operation of the components of the radar system 50, ensure that each component of the radar system 50 has the appropriate information at the appropriate time and facilitate communication between the components of the radar system 50. The module supervisor service 120 can also include a vehicle context monitor 124. The vehicle context monitor 124 can be used to control the communication of vehicle information and commands between the radar system 50 and the vehicle controller 35 and/or the operator of the vehicle 10 via the external communication service 150. In addition, the vehicle context monitor 124 can receive information about the status of the vehicle 10 and provide contextual information to the service managers 125 as described in more detail below. In an embodiment, the contextual information from the vehicle context monitor 124 can correspond to a series of discrete states for the vehicle that may be user-programmable. The vehicle context monitor 124 may switch between states (of the vehicle) in response to changes in vehicle conditions (e.g., velocity) or to other changes relating to the operation of the vehicle.

The module supervisor service 120 can include several service managers 125 that generate tasks for the radar front end 165 based on: 1) information about the surrounding environment (e.g., scene parameters) provided to the service managers 125 by the radar data processing service 130; and 2) contextual information about the vehicle provided to the service managers 125 by the vehicle context monitor 124. The tasks generated by the service managers 125 in response to the received information are provided to the resource manager service 140. The resource manager service 140 can then review each of the tasks received from the service managers 125 and determine whether the task should be executed and/or implemented and in what order the tasks are to be executed and/or implemented by the radar front end 165. The ordered tasks from the resource manager service 140 are provided to the radar control interface 160 for subsequent execution and/or implementation by the radar front end 165.

Figure 6:
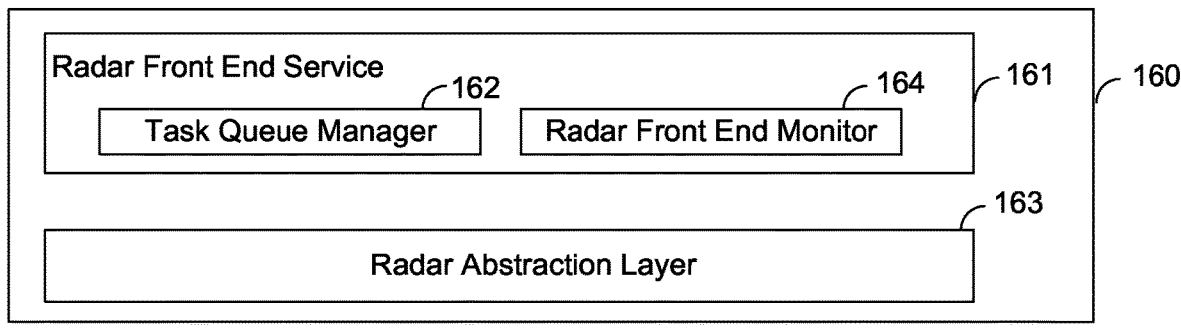
FIG. 6 is a block diagram showing an embodiment of the radar control interface from the radar system of FIG. 3.

FIG. 6 is a block diagram showing an embodiment of the radar control interface 160. The radar control interface 160 can include a radar front end service 161 and a radar abstraction layer 163. In an embodiment, the radar front end service 161 can manage the control and status of the radar front end 165. In addition, the radar front end service 161 can be an abstraction layer for the tasks from the resource manager service 140 to permit the tasks from the resource manager service 140 to be understood by the radar front end 165 such that the radar front end 165 can execute and/or implement the corresponding tasks. The radar front end service 161 can include a task queue manager 162 and a radar front end monitor 164.

The task queue manager 162 receives the tasks from the resource manager service 140 and provides the tasks (e.g., in the order received from the resource manager service 140 or according to a highest priority or ranking) to the radar front end 165 such that the radar front end 165 emits the particular radar scan pattern and corresponding waveforms indicated in the task. In an embodiment, each task can include the emission properties for the waveforms associated with a task and the radar front end service 161 can process the emission properties into corresponding instructions and/or appropriate parameters for the radar front end 165 to implement the task. The radar front end monitor 164 can receive information regarding the health and status of the radar front end 165 from the radar front end 165 to ensure that the radar front end 165 is operating as expected. The front end monitor 164 can also determine when a task has been completed by the radar front end 165 and request another task be added to the task queue manager 162 by the resource manager service 140. In an embodiment, the radar front end monitor 164 can provide the health and status information from the radar front end 165 to the array manager 145 (see FIG. 10) of the resource manager service 140 for subsequent use by the array manager 145 as described in more detail below. The radar abstraction layer 163 can receive "raw" radar data from the radar front end 165 and convert the received data into useful data or information (e.g., an RD(E) map with range, direction and elevation information, spatial spectra information, CFAR (constant false alarm rate) cell information, radar status, etc.) to be provided to the radar data processing service 130 for subsequent processing and/or analysis by the radar data processing service 130 and/or the resource manager service 140.

In an embodiment, the radar control interface 160 can be specifically configured to permit the resource manager service 140 and the radar data processing service 130 (or other components of the radar system 50) to communicate with a particular hardware configuration of the radar front end 165. By using the radar control interface 160 to facilitate communication between both the resource manager service 140 and the radar data processing service 130 and the radar front end 165, a change in the hardware of the radar front end 165 does not require a change to the resource manager service 140 and the radar data processing service 130. Only a change to the radar control interface 160 has to occur to enable communication between both the resource manager service 140 and the radar data processing service 130 and the new radar front end 165. In other words, the resource manager service 140 and the radar data processing service 130 can function with different radar front ends 165 simply by providing the appropriate radar front end service 161 and radar abstraction layer 163 in the radar control interface 160.

Figure 7:
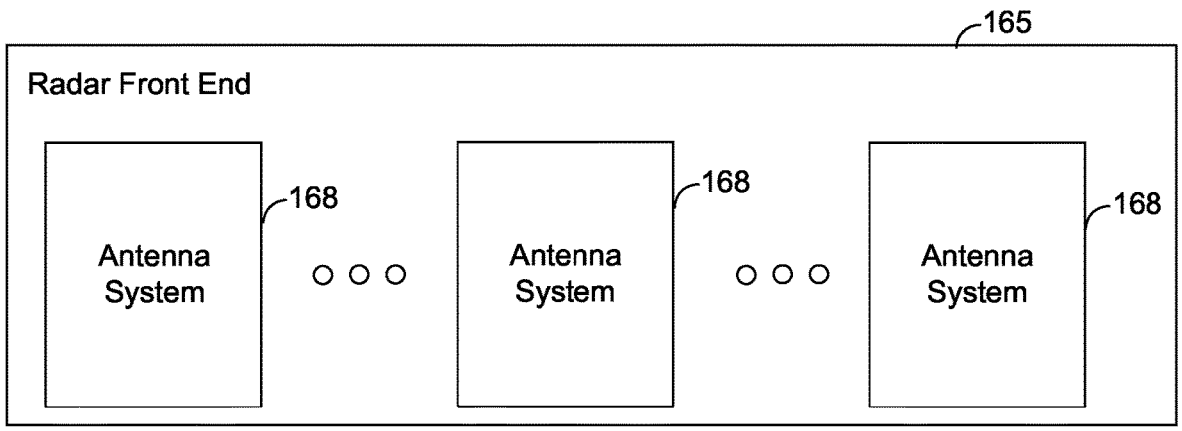
FIG. 7 is a block diagram showing an embodiment of the radar front end from the radar system of FIG. 3.

FIG. 7 is a block diagram showing an embodiment of the radar front end 165. The radar front end 165 can include an array of antenna systems 168 (three are specifically shown in FIG. 7). In an embodiment, the array of antenna systems 168 can include twelve (12) antenna systems 168 positioned at different locations of the vehicle 10, however, other embodiments may include more than twelve antenna systems 168 or fewer than twelve antenna systems 168. The antenna systems 168 of the array of antenna systems 168 can be individually setup and controlled to emit electromagnetic waves (e.g., radio waves) having different waveforms and to receive reflected electromagnetic waves upon the emitted electromagnetic waves being reflected off of an object. The waveform emitted by each antenna system 168 can be based on the emission parameters associated with a particular task provided to the radar front end service 161. The antenna systems 168 can be arranged to emit a particular waveform having particular waveform parameters (which waveform and parameters can change over time) based on the instructions and parameters received from the radar front end service 161. In addition, the instructions and parameters received from the radar front end service 161 can control whether or not a specific antenna system 168 emits a waveform (e.g., a first antenna system 168 may emit a waveform while a second antenna system 168 is inactive and does not emit a waveform). For example, all antenna systems 168 may emit a waveform when a wide view of the environment is desired and only a few antenna systems 168 located at the center of the vehicle 10 may emit a waveform when a narrow view of the environment is desired (e.g., when another vehicle is in front of the vehicle 10).

Figure 8:
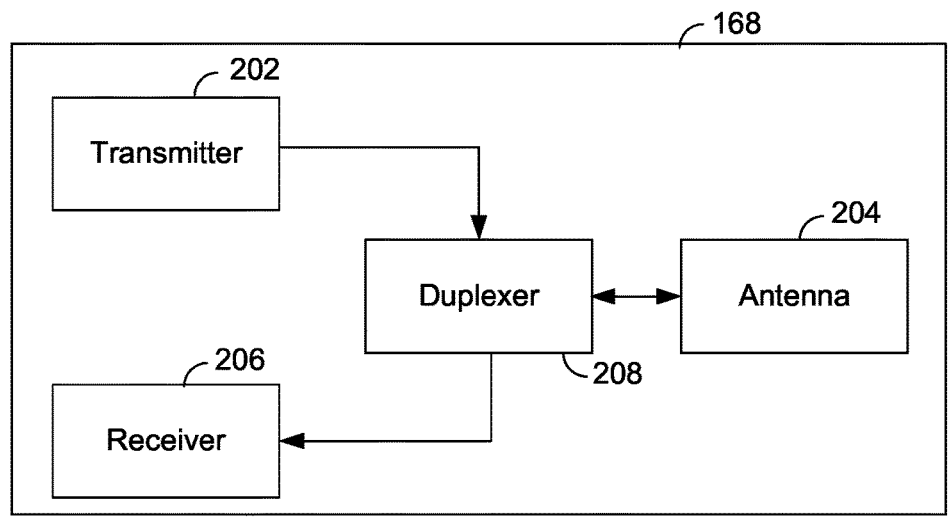
FIG. 8 is a block diagram showing an embodiment of the antenna system from the radar front end of FIG. 7.

As shown in FIG. 8, each antenna system 168 can include a transmitter 202 to emit the electromagnetic waves via an antenna 204 and a receiver 206 to receive reflected electromagnetic waves from an object in the environment via the antenna 204. The antenna system 168 can also include a duplexer 208 to separate transmit and receive signals. Further, it is to be understood that the antenna system 168 may include additional components (not specifically shown) to process signals associated with the transmission and reception of the electromagnetic waves. In an embodiment, the transmitter 202 and the receiver 206 may be incorporated into a transceiver. The antenna systems 168 may be collectively positioned at a common location of the vehicle 10 in one embodiment. However, in other embodiments, each antenna system 168 may be individually positioned at varying locations of the vehicle 10 including the front of the vehicle, the back of the vehicle and both sides of the vehicle.

In an embodiment, each antenna system 168 can be arranged to emit waveforms associated with one or more of short-range radar (SRR), medium-range radar (MRR) and long-range radar (LRR). In an embodiment, SRR can be used to detect objects in the environment up to about 30 yards from the vehicle 10, MRR can be used to detect objects in the environment from about 30 yards from the vehicle to about 100 yards from the vehicle 10, and LRR can be used to detect objects in the environment more than 100 yards from the vehicle 10. For example, the emission parameters associated with one task may result in the antenna systems 168 performing a scan pattern that includes one or more SRR scans followed by one or more LRR scans. In addition, the antenna systems 168 can emit waveforms having a frequency range of about 77 GHz. However, in other embodiments, the antenna systems 168 can emit waveforms having a frequency in the range of 76 GHz-81 GHz.

In an embodiment, the antenna systems 168 are generally arranged for ground-to-ground radar applications (i.e., the vehicle 10 is located on the ground and the radar system 50 is being used to detect objects that are also located on the ground). Each antenna system 168 can have a substantially fixed position on the vehicle 10 and emits waveforms in a predefined "beam-pointing direction" (e.g., a fixed azimuth angle and a substantially fixed elevation angle). In other words, the position and beam-pointing direction of each antenna system 168 cannot be changed by the tasks from the radar control interface 160. The radar control interface 160 can only provide instructions to the radar front end 165 that control the waveforms emitted by the antenna systems 168.

As the antenna systems 168 receive the reflected electromagnetic waves from objects in the environment, the antenna systems 168 provide the corresponding "raw" data from the reflected electromagnetic waves to the radar abstraction layer 163. The radar abstraction layer 163 can then take the data from the antenna systems 168 and convert the data into appropriate data (e.g., an RD(E) map with range, direction and elevation information, spatial spectra information, and/or CFAR (constant false alarm rate) cell information) for the radar data processing service 130 to process the data into one or more higher-level data products (e.g., a "scene" parameter).

Figure 9:
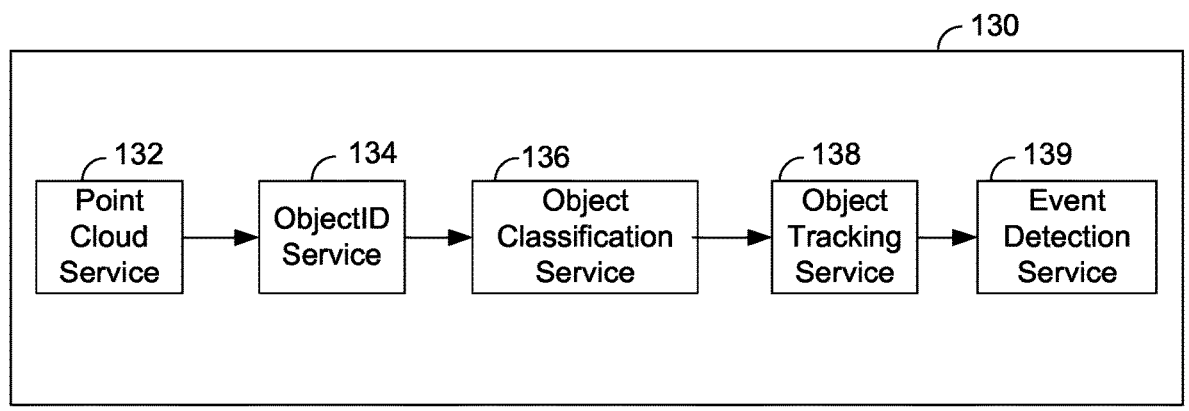
FIG. 9 is a block diagram showing an embodiment of the radar data processing service from the radar system of FIG. 3.

FIG. 9 is a block diagram showing an embodiment of the radar data processing service 130. The radar data processing service 130 can take raw data from the radar front end 165 (after conversion by the data abstraction layer 163) and detect and track one or more objects (if present) in the environment (or 3D vector space) from the raw data. For example, the radar data processing service 130 can make determinations regarding the type of object detected (e.g., a car or person), is the object moving or are multiple objects present, etc. The radar data processing service 130 can detect and track the objects using scene parameters corresponding to a world view of the environment (e.g., an object in front of the vehicle at a particular location with a particular certainty). The scene parameter for an object can include descriptive statistics such as a type and/or a kinematic state (e.g., position and velocity) for the object.

As shown in FIG. 9, the radar data processing service 130 can include a point cloud service 132, an object identification (object) D) service 134, an object classification service 136, an object tracking service 138 and an event detection service 139. The point cloud service 132 can receive the raw data (e.g., an RD(E) or an R-D-El map with range, direction and elevation information, spatial spectra information, and/or CFAR cell information) from the radar front end 165 (via the radar abstraction layer 163 of the radar control interface 160) and convert the raw data into one or more point clouds that define points in a space. In addition, the point cloud service 132 can provide, for each point in a point cloud, information relating to its velocity (or Doppler), range, azimuth and, in some embodiments, elevation. In an embodiment, the point cloud service 132 can apply different resolution algorithms (based on an input from the resolution manager 147) to the raw data to generate point clouds of differing resolution (i.e., the number of points in the point cloud) such that different aspects of the environment can be examined or analyzed. In another embodiment, the point cloud service 132 can use either cell averaging CFAR or can calculate a threshold for power (power thresholding) to construct a point cloud. The point cloud information (e.g., the point clouds and a distance between points) can then be provided to the objectID (object identification) service 134, which can then look at the points and perform clustering to determine or detect if an object is present in the environment. In an embodiment, the objectID service 134 can use a DBSCAN clustering algorithm to detect objects and can calculate centroids to represent detections. However, other suitable clustering algorithms may be used in other embodiments.

The object classification service 136 can use an object list with object information from the objectID service 134 to classify the type of object (e.g., from a list of possible types of objects) that was detected and provide (or revise, if previously classified) a confidence level for the classification. In an embodiment, the object classification service 136 can classify objects by passing point cloud clusters through a graph neural network to determine the specific type of object. In another embodiment, the object classification service 136 can perform a static classification of an object based on a single frame of data using a "naïve" Bayesian network. Some examples of object classifications can include pedestrian, bicyclist, motorcycle, car truck, stationary object, road obstacle, wall, bridge, hydrant, or stoplight.

The object tracking service 138 can use the object information in the classified object list from the object classification service 136 to track the object over time to determine if the same object is present and generate track information (or a track) for the object. The track information can include kinematic properties of the object and elevation, azimuth and range information about the object. The object tracking service 138 may also perform a secondary classification of the object using a "dynamic" Bayesian network that applies a recursive Bayesian inference to update the belief about what the object is over time. In an embodiment, the object tracking service 138 can associate detected objects with currently known tracks using a Jonker-Volgenant algorithm. However, other suitable tracking algorithms may be used in other embodiments. In addition, the object tracking service 138 can provide position prediction and filtering using either an alpha-beta filter or an extended Kalman filter. However, other suitable types and/or configurations of filters may be used in other embodiments. In an alternate embodiment, the object tracking service 138 can receive the object list with object information from the objectID service 134 to group the objects from the object list into one or more tracks. The track information on an object from the object tracking service 138 can then be provided to the object classification service 136 for classification of the object.

The event detection service 139 can receive track information (or tracks) for different objects from the object tracking service 138 and determine if there are any relationships between individual objects (and their corresponding tracks) that may correspond to a possible "event." For example, the event detection service 139 may determine that there is a relationship between a pedestrian track and one or more stationary object tracks, which information can then be used by the event service manager 128 to determine that a person may be standing between parked cars. The radar data processing service 130 can provide point cloud information from the point cloud service 132, updated track information and/or scene parameters from the object tracking service 138 and relationship (or event) information from the event detection service 139 to the service managers 125 of the module supervisor service 120 to enable the service managers 125 to interpret or comprehend what is occurring in the environment (or a particular scene) to be able to make decisions on how to control the radar front end 165 to interact with the environment.

The service managers 125 can use control AI (artificial intelligence) to make determinations on the importance of objects in the environment and to control the operation of the radar front end 165 to optimize radar usage. For example, the service managers 125 can be used to determine the desired actions of the radar front end 165 (when interacting with the environment) to increase the radar system's knowledge of what is going on in the environment. The service managers 125 can include a search service manager 126, a track service manager 127 and an event service manager 128. Each of the search service manager 126, the track service manager 127 and the event service manager 128 generate tasks for the radar front end 165 that are used to optimize the particular services provided by the search service manager 126, the track service manager 127 and the event service manager 128. In an embodiment, the search service manager 126, the track service manager 127 and the event service manager 128 can use contextual information on the vehicle from the vehicle context monitor 124 when selecting and prioritizing tasks (and corresponding waveforms) for the radar front end 165. The search service manager 126 can be used to determine where to scan to passively track objects in the environment and to locate new objects in the environment surrounding the vehicle 10. The search service manager 126 can use the scene parameters and other information (e.g., vehicle velocity or vehicle steering angle) to generate tasks for the radar front end 165 that correspond to a radar scan pattern that can operate to passively track objects and locate new objects in the environment. For example, the search service manager 126 may select from a first group of tasks (or waveforms) based on a first vehicle context (e.g., a parking lot) from the vehicle context monitor 124 and a second group of tasks (or waveforms) based on a second vehicle context (e.g., a freeway) from the vehicle context monitor 124. The track service manager 127 can be used to review the scene parameter(s) from the radar data processing service 130 and determine if the collection of additional information (e.g., higher resolution information or data) about an object is desirable or if there is a collision possibility between an object and the vehicle 10. In an embodiment, the track information updates from the object tracking service 138 can include information regarding the scene parameters. Similar to the search service manager 126, the track service manager 127 can generate tasks for the radar front end 165 (e.g., a particular radar scan pattern) that can operate to obtain additional information about an object (e.g., from an increase in resolution or an increase in the confidence of the detected information) or obtain additional information to determine the probability of a collision with an object.

The track service manager 127 can use the scene parameters and/or the track information updates from the radar data processing service 130 with a prioritization scheme to determine if additional information about a particular object is to be collected. For example, when the vehicle 10 is moving at a higher rate of speed or is located on a freeway, the track service manager 127 can prioritize objects that are further downfield from the front of the vehicle 10, while when the vehicle 10 is moving at a lower rate of speed or is located on surface streets, the track service manager 127 can prioritize objects that are both more directly in front of the vehicle 10 and to the sides of the vehicle 10. In another example, an object getting closer to the vehicle 10 (such as the object slowing down or stopping in front of the vehicle 10) can be prioritized for additional information over an object moving away from the vehicle 10. In addition, if the collection of additional information is determined to be desirable, the track service manager 127 can use the observations from the environment (e.g., the scene parameters) along with information on past actions (e.g., past knowledge), goals and preferences for the radar system 50 and the abilities of the radar front end 165 (from the configuration data 170) to determine the appropriate waveforms for the radar front end 165 to gather more information about an object that can result in an increase in the confidence of the data associated with the object.

In an embodiment, the track service manager 127 can include an artificial neural fuzzy inferencing system (ANFIS) to analyze the track information updates from the radar data processing service 130 and create the task requests (and corresponding radar scan patterns) for the radar front end 165. The ANFIS can be a hybrid of neural network concepts and fuzzy logic concepts where the nodes of the network are user-selected based on the features expected to be seen from the track information updates. The track service manager 127, more specifically the ANFIS, can evaluate the object type and kinematic properties from the track information update to determine an "importance" level for the object and corresponding track in the environment. In an embodiment, the importance value can be a numeric value that indicates an object's relevance to the trajectory of the vehicle 10. For example, an object such as the second vehicle 15 in front of vehicle 10 can have a higher importance value (indicating more importance to the trajectory of the vehicle 10) than an object such as a tree to the side of the vehicle 10, which would have a lower importance value (indicating less importance to the trajectory of the vehicle 10). Once the importance level for the object reaches a predefined threshold value (indicating that the object may impact the trajectory of the vehicle 10), additional information can be collected about the object.

The ANFIS of the track service manager 127 can generate radar scan patterns having particular waveforms to be emitted by the antenna systems 168 of the radar front end 165 to collect the additional information. The radar scan patterns can include different waveforms where waveform parameters, such as pulse width, chirp parameters (including frequency and slope), number of pulses, etc., can be changed to more effectively collect information about a particular aspect of the object. For example, if the importance threshold value was exceeded by an object moving into the trajectory of the vehicle 10 (e.g., the second vehicle 15 moves into the same lane as the vehicle 10), a first set of waveforms and corresponding waveform parameters can be implemented to collect information relating to the closing speed for the object. In contrast, if the importance threshold value was exceeded by an object already in the trajectory of the vehicle 10 (e.g., a slower moving second vehicle 15 in the same lane as the vehicle 10), a second set of waveforms and corresponding parameters may be implemented to more accurately determine the range of the object.

In an embodiment, the ANFIS of the track service manager 127 can make decisions on priority and waveforms to use to collect information (e.g., range or closing speed) about detected objects. The ANFIS of the track service manager 127 can be trained to make particular priority and waveform decisions based on particular observations from the environment. In an embodiment, the waveform decisions can be based on the needs of the track service manager 127 and entropy considerations. The training of the track service manager 127 can include classic convex optimization with closed form equations that optimize the waveform for a particular task. The deep neural network of the ANFIS of the track service manager 127 can also be trained to provide desired outputs by collecting data as the vehicle 10 is operated on the road 20. In addition, the deep neural network can also be trained to provide desired outputs by providing the deep neural network with simulation data that can specifically address situations that may be encountered by the vehicle (e.g., a second vehicle moving directly in front of the vehicle 10) and the corresponding tasks (e.g., radar scan patterns with specific waveforms) to be provided to the radar front end 165.

The event service manager 128 can receive information on multiple tracks associated with multiple objects from the event detection service 139 and contextual information on the vehicle from the vehicle context monitor 124. The event service manager 128 can then apply heuristics to review the multiple tracks and corresponding objects to determine if an event may occur. If the event service manager 128 determines that an event may occur, the event service manager 128 can create task requests (and corresponding radar scan patterns) for the radar front end 165 to gather more information about the tracks (and objects) to better analyze the possible event. In an embodiment, the service managers 125 can also include a collision mitigation (or avoidance) manager (not shown). The collision mitigation manager can receive point cloud information from the point cloud service 132 and track information from the object tracking service 138. The collision mitigation manager can make determinations regarding the possibility of a collision between the vehicle 10 and a corresponding singular object in the environment. The collision mitigation manager can create high priority task requests (and corresponding radar scan patterns) for the radar front end 165 to attempt to gather more information about the object and its track if the possibility of collision reaches a predefined threshold.

Figure 10:
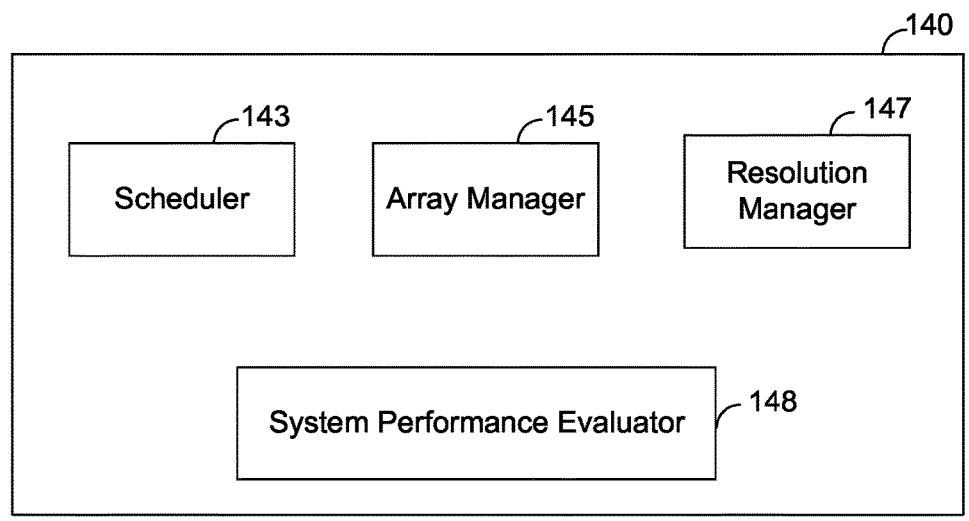
FIG. 10 is a block diagram showing an embodiment of the resource manager service from the radar system of FIG. 3.

FIG. 10 is a block diagram showing an embodiment of the resource manager service 140. The resource manager service 140 can include a scheduler 143, an array manager 145, a resolution manager 147 and a system performance evaluator 148. The tasks generated by the search service manager 126, the track service manager 127 and the event service manager 128 can be provided to the scheduler 143. The scheduler 143 can adjudicate between the provided tasks (e.g., rank and/or prioritize the tasks) to determine the tasks (whether from the search service manager 126, the track service manager 127, the event service manager 128 or elsewhere) that optimize the performance of the radar system 50. After evaluating the tasks, the scheduler 143 can provide tasks to the radar control interface 160 for execution by the radar front end 165.

Figure 11:
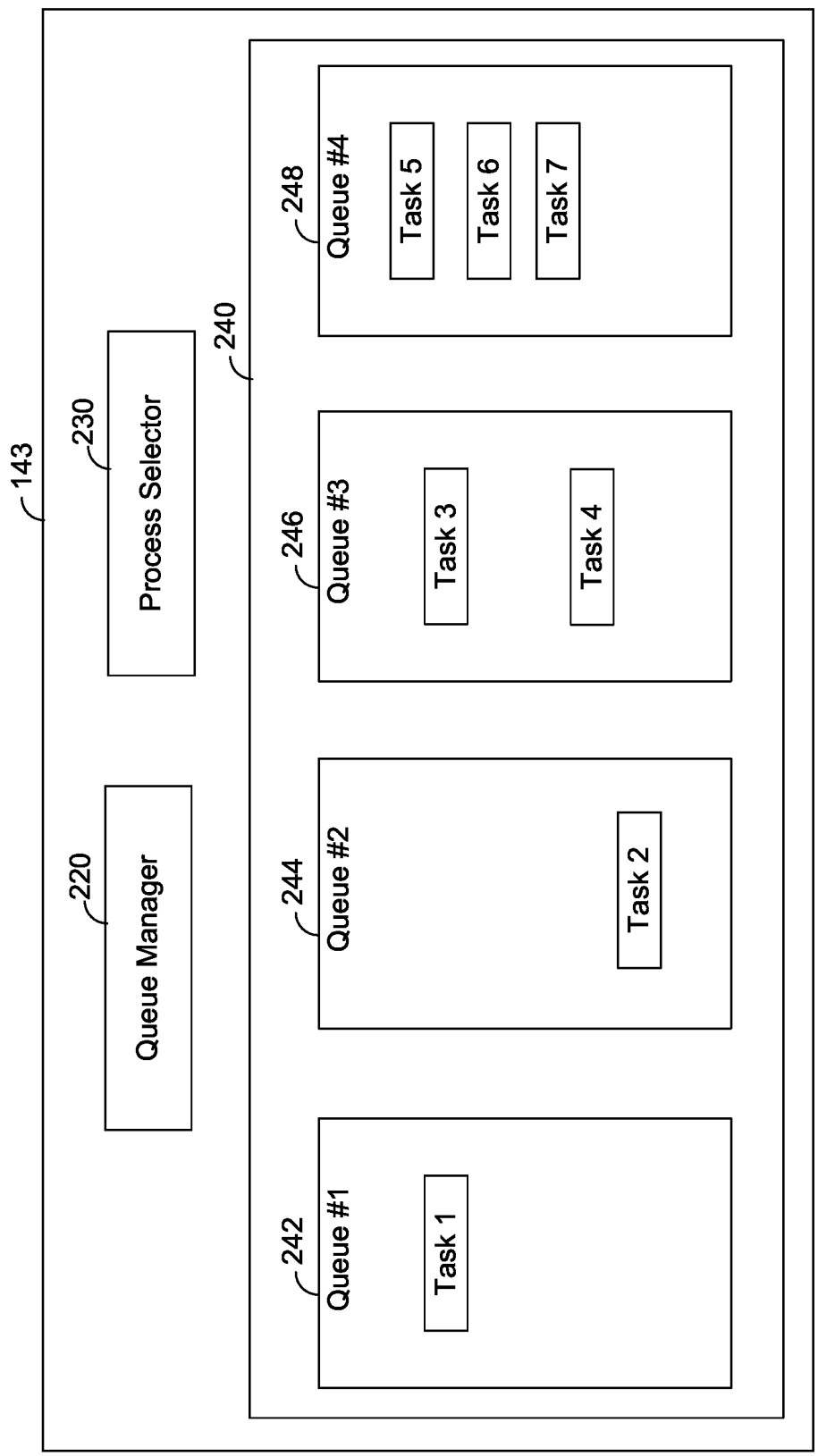
FIG. 11 is a block diagram showing an embodiment of the scheduler from the resource manager service of FIG. 10.

In an embodiment, the scheduler 143 can incorporate a multi-level feedback queue for the tasks to be scheduled. The multi-level feedback queue can incorporate several separate task queues that are arranged by an order of precedence or priority. FIG. 11 is a block diagram showing an embodiment of the scheduler 143. The scheduler 143 can include a multi-level feedback queue 240 with four separate queues for tasks to be executed by the radar front end 165. While the multi-level feedback queue 240 shows four queues (or task lists), it is to be understood that the multi-level feedback queue 240 can include fewer than four queues (e.g., 2 or 3 queues) or more than four queues (e.g., 5, 6 or more queues). The queues of the multi-level feedback queue 240 can be arranged by the precedence or priority associated with the queue such that tasks in a higher precedence queue take priority over tasks in a lower precedence queue. As shown in FIG. 11, a first queue 242 can have the highest precedence and a second queue 244 can have the second highest precedence. A third queue 246 can have the third highest precedence and a fourth queue 248 can have the lowest precedence. When providing tasks to the radar control interface 160 for the radar front end 165, the scheduler 143 can select the tasks from the first queue 242 followed by the tasks from the second queue 244. After the tasks from the first queue 242 and the second queue 244 have been provided to the radar control interface 160, the scheduler 143 can then select the tasks from the third queue 246 and then finally the tasks from the fourth queue 248. In addition, the tasks in each queue can be ordered or ranked such that the tasks in a particular queue can be selected from the queue in a predetermined order. In the embodiment shown in FIG. 11, the scheduler 143 would provide tasks to the radar control interface 160 in the following order: task 1, task 2, task 3, task 4, task 5, task 6 and task 7.

The scheduler 143 can also include a queue manager 220 and a process selector 230. The queue manager 220 can be used to place the tasks received from the search service manager 126, the track service manager 127, the event service manager 128 or elsewhere (e.g., from a perception stack of the vehicle controller 30) into one of the queues of the multi-level feedback queue 240 based on a precedence assigned to the task by the creator (e.g., a service manager 125) of the task. In one embodiment, when the queue manager 220 receives a task associated with a potential collision (i.e., a task with a high precedence), the queue manager 220 can preempt the execution of other tasks and place the task associated with a potential collision into the first queue 242 for immediate execution by the radar front end 165. The track service manager 127 and/or the collision mitigation manager (if implemented) may make determinations regarding a potential collision with an object that is above a predetermined possibility of a false alarm or false positive and provide corresponding tasks to the scheduler 143 that collect information about the potential collision with the object. In addition, the queue manager 220 can place tasks associated with external commands from the vehicle 10 (e.g., tasks from the perception stack of the vehicle controller 30) into the second queue 244. By placing the tasks from the vehicle 10 into the second queue 244, the queue manager 220 is giving the tasks from the vehicle 10 priority over the tasks from the service managers 125 but not preempting any tasks associated with potential collision events. Tasks from the track service manager 127 that relate to non-threatening track updates (i.e., track updates that do not relate to a potential collision event) can be placed in the third queue 246. The tasks from the service managers 125 (e.g., the search service manager 126, the track service manager 127, the event service manager 128) associated with obtaining information about the environment (i.e., tasks not associated with an object or track) can be placed in the fourth queue 248. In an embodiment, many of the tasks received by the queue manager 220 are placed into the fourth queue 248 since tasks associated with collecting information about the environment are continually being generated by the service managers 125.

When placing a task into a queue, the queue manager 220 can also order or rank the task in the queue. In one embodiment, the queue manager 220 can use a FIFO (first in, first out) or a FCFS (first come, first serve) system for ordering tasks in a queue. In other words, the first task placed into the queue is the first task taken from the queue to be provided to the radar front end 165 and the second task placed into the queue is the second task taken from the queue to be provided to the radar front end 165. However, in other embodiments, the queue manager 220 can either assign a ranking to a task or use a ranking for the task provided by the corresponding service manager that generated the task and then order the tasks in the queue based on each task's assigned ranking.

In addition, the queue manager 220 can move tasks between queues (e.g., move a task from a lower precedence queue to a higher precedence queue or move a task from a higher precedence queue to a lower precedence queue) in order to optimize performance of the radar system 50. In one embodiment, the queue manager 220 can make decisions to move tasks between queues based on information and/or input from the system performance evaluator 148. The system performance evaluator 148 can receive information from the radar control interface 160 about the execution of tasks by the radar front end 165. For example, the system performance evaluator 148 can receive information about when a task is started by the radar front end 165 and when a task is completed by the radar front end 165 and/or information about the amount time required to execute the task. The system performance evaluator 148 can also receive information from the scheduler 143 regarding the tasks being sent to the radar control interface 160 (e.g., the task was provided by the track service manager 127 or the task was provided by the search service manager 126). In addition, the system performance evaluator 148 can receive, from each service manager 125, quality of service (QoS) information (e.g., a rating) that provides information about the performance of that service manager 125.

The system performance evaluator 148 can then process the received information about the tasks (e.g., the types and/or waveforms of the tasks being executed, the sources of the tasks and the execution time for the tasks) to generate higher level information about the tasks being executed by the radar front end 165. In an embodiment, the system performance evaluator 148 can determine information such as the average time to complete a particular task, the percentage of time a particular task is being executed or the percentage of time the radar front end 165 is executing tasks associated with a particular service manager 125. In addition, the system performance evaluator 148 can also process the QoS information from the service managers 125 to evaluate the performance of individual service managers 125 and to determine an overall system performance metric.

The system performance evaluator 148 can then use the information about the tasks being executed by the radar front end 165, the QoS information regarding the performance of the service managers 125, and whether the overall system performance metric has reached a critical level (e.g., the performance metric has gone above or fallen below a corresponding threshold) to provide input and/or information about the performance of the radar system 50 to the queue manager 220 of the scheduler 143 to enable the queue manager 220 to identify tasks and adjust the priority and/or ranking of the identified tasks to optimize performance of the radar system 50 and the service managers 125 and comply with system-level performance requirements. For example, the system performance evaluator 148 can inform the queue manager 220 of the scheduler 143 that more tasks are being sent for tracking (i.e., tasks from the track service manager 127) than tasks for searching (i.e., tasks from the search service manager 126) such that the system-level requirements directed to the percentage of search time and the percentage of track time are not being satisfied. In response, the queue manager 220 can use the information from the system performance evaluator 148 to identify tasks in the queues associated with searching and adjust the ranking of the identified searching tasks in a queue and/or move the searching tasks to a queue having a higher precedence such that more tasks for searching are being sent to the radar control interface 160 for the radar front end 165.

The process selector 230 can be used to provide tasks to the radar control interface 160. In an embodiment, the process selector 230 can select two tasks for the radar control interface 160 by selecting the two highest ranked or ordered task(s) from the queue(s) having the highest precedence. However, in other embodiments, more than two tasks or one task may be selected by the process selector 230 for the radar control interface 160. When selecting tasks, once all of the tasks from a queue have been selected (or if there are no tasks assigned to a queue), the process selector 230 can then select the highest ranked or ordered task(s) from the queue having the next highest precedence to provide to the radar control interface 160. In addition, each time the process selector 230 selects tasks for the radar control interface 160, the process selector 230 restarts the task selection process with the queue having the highest precedence.

In an embodiment, each task assigned to a queue can have an associated lifetime or "do by" time for that task. If a task is not selected for execution by the process selector 230 within the lifetime for that task, the task is removed or deleted from its corresponding queue and is no longer available for selection or execution. By permitting "expired" tasks to be removed from the queues, the scheduler 143 can avoid situations where "stale" tasks (e.g., tasks that do not provide useful information) are provided to the radar front end 165. The lifetime associated with a task is determined when the task is created and can be either for a predetermined time period or for a continuous (or unlimited) time period. If a task has a continuous time period, the task remains in the multi-level feedback queue 240 until it is selected by the process selector 230 or the creator of the task (e.g., a service manager 125) sends a request or instruction to the scheduler 143 to purge or remove the task.

Referring back to FIG. 10, the resource manager service 140 can also include an array manager 145 to manage the resources of the radar front end 165 and a resolution manager 147 to control operation of the point cloud service 132 and the digital signal processing performed therein. The array manager 145 can receive information about the health and status of the radar front end 165 from the radar front end monitor 164. In an embodiment, the array manager 145 may exchange information regarding the operation and performance of the radar front end 165 with the system performance evaluator 148. The array manager 145 can then evaluate the information (e.g., temperature or element status) relating to the radar front end 165 and determine if any tasks are desirable to improve operation of the radar front end 165 such that the radar front end 165 is not overtaxed (e.g., a "blank dwell" task to provide temperature control). The tasks, if any, generated by the array manager 145 can then be provided to the queue manager 220 of the scheduler 143 for placement into the appropriate queue and subsequent implementation by the radar front end 165. For example, the tasks from the array manager 145 may be placed in the third queue 246 or given the highest ranking in the fourth queue 248 such that the tasks from the array manager 145 are executed more promptly than tasks from the search managers 125 to ensure appropriate and reliable operation of the radar front end 165. The resolution manager 147 can receive information about the status of the vehicle 10 from the vehicle context monitor 124 of the module supervisor service 120 and track information (e.g., a track list) from the track service manager 127. The resolution manager 147 can then evaluate the information relating to the status of the vehicle 10 and the track information to determine the appropriate resolution algorithm (e.g., a high resolution algorithm or a low resolution algorithm) to be applied by the point cloud service 132 when processing the "raw" data from the radar front end 165. For example, a high resolution algorithm may be applied in order to get a higher resolution (e.g., more points) in a generated point cloud.

Figure 12:
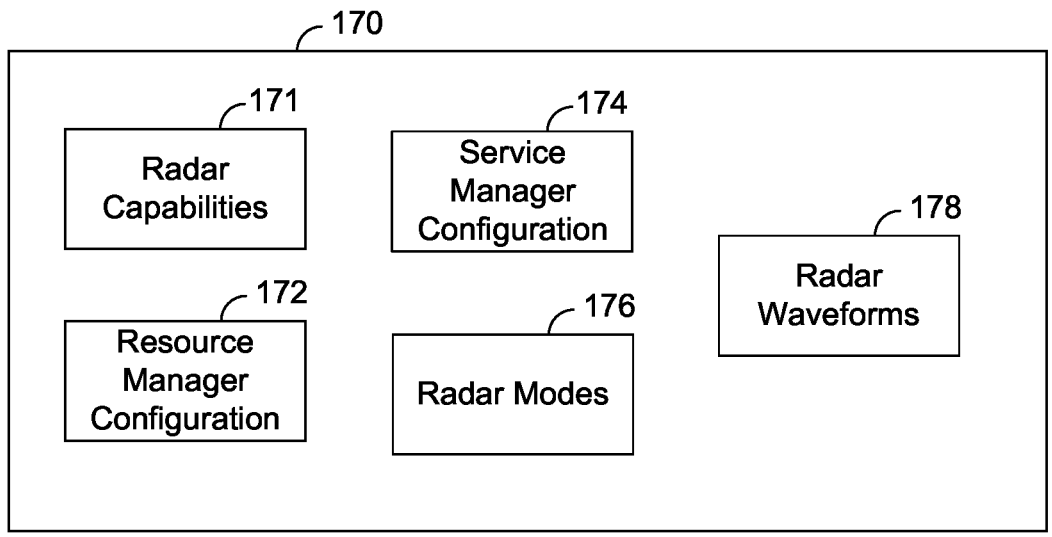
FIG. 12 is a block diagram showing an embodiment of the configuration data from the radar system of FIG. 3.

FIG. 12 is a block diagram showing an embodiment of the configuration data 170. The configuration data 170 can include information regarding different possible configurations and/or capabilities of the components of the radar system 50. The module supervisor service 120, radar data processing service 130, the resource manager service 140 and the external communication service 150 can use information stored in configuration data 170 when performing the functions or operations of the radar system 50. The configuration data 170 can include radar capabilities data 171, resource manager configuration data 172, service manager configuration data 174, radar mode data 176 and radar waveform data 178. In other embodiments, the configuration data 170 may include additional types of data pertaining to the operation and performance of the radar system 50.

The radar capabilities data 171 provides information on the radar front end 165 that can be used by the radar front end monitor 164 when evaluating the radar front end 165. In an embodiment, the radar capabilities data 171 can include information regarding the operation of the radar front end 165 such as bandwidths (e.g., 500 MHz), operating frequencies (e.g., 76 GHz-81 GHz), mode switch times, beamforming, time division multiple access, frequency division multiple access, etc. The resource manager configuration data 172 provides information about the configuration of the resource manager service 140. The service manager configuration data 174 can provide information on the configuration of each of the service managers 125 incorporated into the module supervisor service 120. The service manager configuration data 174 include information regarding the number of service managers 125 included with the module supervisor service 120 and a corresponding universal parameter set with information on each of the service managers 125. The radar mode data 176 can include a list of preset modes of operation for the radar front end 165 that can be used by the search service manager 126 and the track service manager 127 when generating tasks. The radar waveform data 178 can include a list of preset waveforms that can be output by the radar front end 165 that can be used by the search service manager 126 and the track service manager 127 when generating tasks.

Figure 13:
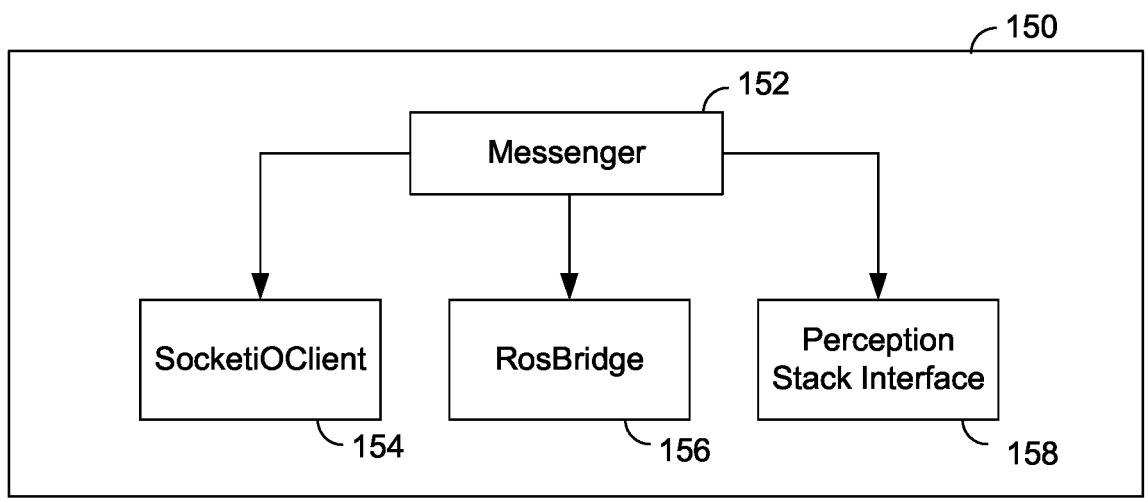
FIG. 13 is a block diagram showing an embodiment of the external communication service from the radar system of FIG. 3.

FIG. 13 is a block diagram showing an embodiment of the external communication service 150. The external communication service 150 can receive state information (e.g., resource manager state and radar system data state) from vehicle context monitor 124 of the module supervisor service 120 and provide vehicle state information and external command information to the vehicle context monitor 124 of the module supervisor service 120. The external communication service 150 includes a messenger 152 that facilitates communications between the vehicle context monitor 124 of the module supervisor service 120 and the external software engines (or systems) of the vehicle control system 30. As shown in FIG. 13, the external communication service 150 can include a socketiOClient interface 154, a RosBridge interface 156 and a perception stack interface 158 in communication with the messenger 152. The socketiOClient interface 154 can provide information for display to a socketiOServer of the display GUI 155. The RosBridge interface 156 can use the vehicle interface 190 to enable communication of information between a RosCore of a RVIZ (ROS visualization) system of the vehicle controller 35 and the external communication service 150. In an embodiment, the RVIZ can be a 3D visualization software tool for robots, sensors, and algorithms that permits a user to see the robot's perception of its world (real or simulated). The perception stack interface 158 can use the vehicle interface 190 to enable communication of information, such as vehicle state and directed commands, between a perception stack of the vehicle controller 35 and the external communication service 150.

Figure 14:
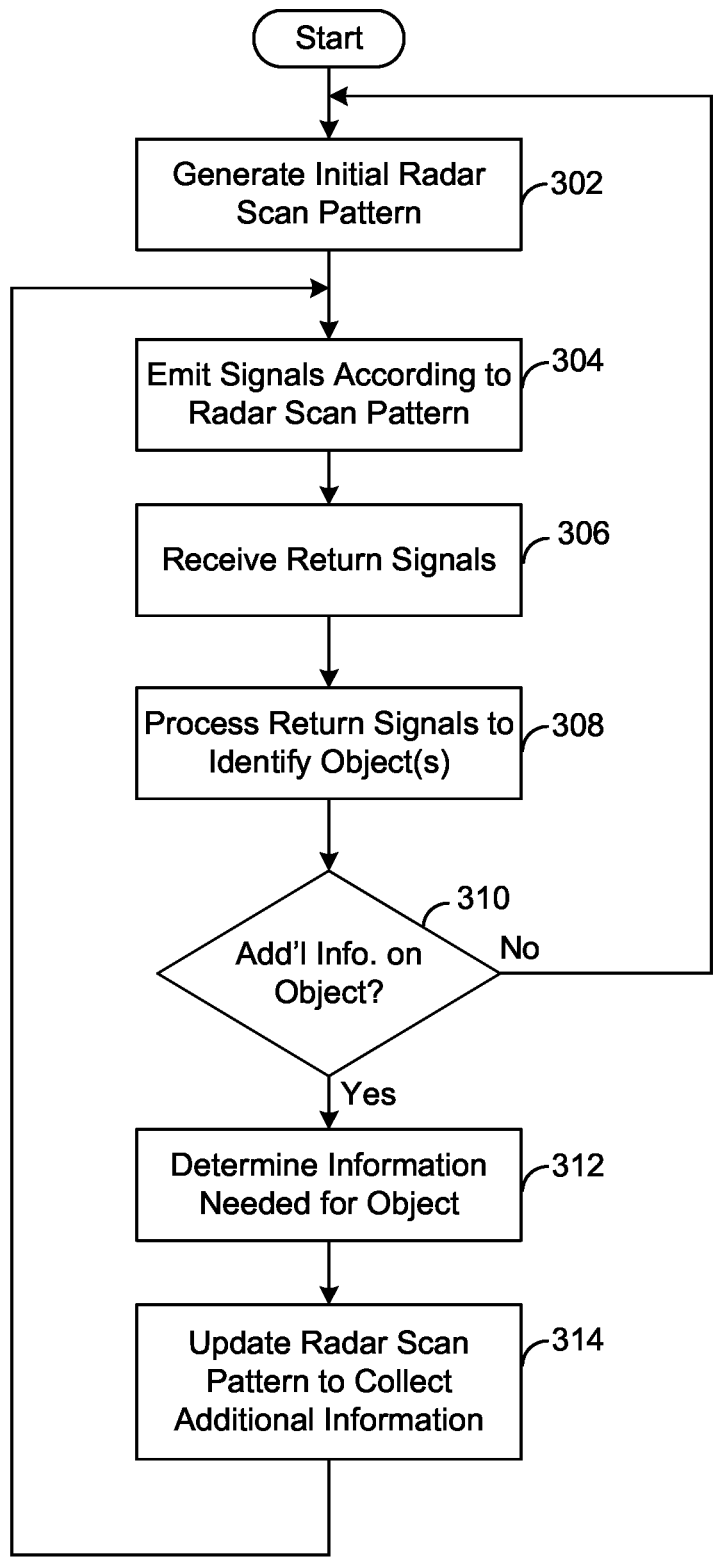
FIG. 14 is a flowchart showing an embodiment of a process for operating the radar system of FIG. 3.

FIG. 14 is directed to an embodiment of a process for determining a radar scan pattern to be emitted by a vehicle 10. The process begins by generating an initial radar scan pattern to be emitted by the radar front end 165 of the vehicle 10 (step 302). The initial radar scan pattern can include several different waveforms from the search service manager 126 that can be used to detect objects in the environment around the vehicle 10. The search service manager 126 provides the initial radar scan pattern to the scheduler 143 for subsequent providing to the radar control interface 160. The tasks associated with the initial radar scan pattern are provided to the task queue manager 162 of the radar front end service 161. The task queue manager 162 of the radar front end service 161 provides the associated tasks for the initial scan pattern to the radar front end 165.

The radar front end 165 can then emit the waveforms from the initial radar scan pattern (step 304) as set forth in the associated tasks for the initial radar scan pattern. The radar front end 165 then receives the return signals from the emitted waveforms (step 306). The radar front end 165 can then provide the raw data associated with the return signals to the radar abstraction layer 163 of the radar control interface 160. The radar control interface 160 then provides the raw data from the radar front end 165 to the radar data processing service 130. The radar data processing service 130 can process the raw data to generate scene parameters for one or more objects (step 308) based on the raw data. The radar data processing service 130 can identify the presence of an object, the type or class of the object and the track of the object in the scene parameters. The radar data processing service 130 can then provide the information regarding the object in the scene parameters to the service managers 125 of the module supervisor service 120.

The service managers 125 can then process the information about the object in the scene parameters received from the radar data processing service 130 and determine if additional information about the object is to be collected (step 310). The collection of additional information can be based on a determination made by the track service manager 127 regarding the importance of the object (i.e., the object has not reached the corresponding importance threshold) or a determination made by the track service manager 127 that all information obtainable about the object from the radar system 50 has been obtained (e.g., a signal-to-noise ratio indicates that additional information cannot be collected). If no additional information about the object is to be collected, the radar front end 165 can continue to emit the initial radar scan pattern, as requested by the search service manager 126, to search for objects in the environment around the vehicle 10.

However, if the service managers 125 determine that the collection of additional information about the object is desirable, the track service manager 127 can determine the additional desired information (e.g., additional parameters, additional points which represent the object (in the point cloud) or an increase in the resolution or confidence of known parameters) about the object (step 312) based on the scene parameters and the corresponding environment for the vehicle 10. The track service manager 127 can use the object information from the scene parameters to determine the additional information about the object that would be useful to the radar system 50 and the corresponding waveforms to be emitted by the radar front end 165 to collect the additional information. Based on the determination of the additional information about the object that is to be collected, the track service manager 127 can generate tasks associated with an updated scan pattern to collect the desired information (step 314).

The tasks associated with the updated scan pattern from the track service manager 127 are provided to the scheduler 143 for subsequent providing to the radar front end 165 as described above. The scheduler 143 can select the tasks associated with the updated radar scan pattern from the track service manager 127 over the tasks associated with the initial radar scan pattern from the service search manager 126 assuming that collecting information about a detected object is determined to have a higher priority than searching for additional objects. The track service manager 127 can generate several different additional radar scan patterns to collect different types of information (e.g., range or closing speed) about a known object. Each additional radar scan pattern can be different from the initial radar scan pattern and other additional radar scan patterns because different types of information about the object are to be detected and different patterns of waveforms can be used to collect the different types of information.

Although the figures herein may show a specific order of method steps, the order of the steps may differ from what is depicted. Also, two or more steps may be performed concurrently or with partial concurrence. Variations in step performance can depend on the software and hardware systems chosen and on designer choice. All such variations are within the scope of the application. Software implementations could be accomplished with standard programming techniques, with rule based logic and other logic to accomplish the various connection steps, processing steps, comparison steps and decision steps.

It should be understood that the identified embodiments are offered by way of example only. Other substitutions, modifications, changes and omissions may be made in the design, operating conditions and arrangement of the embodiments without departing from the scope of the present application. Accordingly, the present application is not limited to a particular embodiment, but extends to various modifications that nevertheless fall within the scope of the application. It should also be understood that the phraseology and terminology employed herein is for the purpose of description only and should not be regarded as limiting.

What is claimed is:

1. A radar system for a vehicle comprising:
   a front end configured to detect one or more objects in an environment surrounding the vehicle with electromagnetic radiation, the front end comprising one or more antenna systems configured to emit and receive electromagnetic radiation;
   a control system configured to control operation of the one or more antenna systems of the front end, the control system comprising:
      a processor;
      a memory device storing logic configured to determine a plurality of sets of waveforms to be emitted by the one or more antenna systems and to evaluate return signals received by the one or more antenna systems in response to an emitted set of waveforms; and
      the logic comprising instructions that, when executed by the processor, cause the processor to:
         analyze return signals received by the one or more antenna systems in response to the emission of a first set of waveforms;
         generate one or more parameters associated with the environment surrounding the vehicle from the analysis of the return signals;
         generate a plurality of second sets of waveforms based on the generated one or more parameters associated with the environment surrounding the vehicle, wherein each second set of waveforms of the plurality of second sets of waveforms is different from the first set of waveforms;
         assign each second set of waveforms of the plurality of second sets of waveforms into a queue of a plurality of queues based on a corresponding priority of the second set of waveforms, wherein each queue of the plurality of queues is associated with a different priority level;
         select one or more second sets of waveforms from the plurality of second sets of waveforms based on corresponding priorities associated with each of the second sets of waveforms;
         provide the selected second sets of waveforms for emission by the one or more antenna systems of the front end;
         subsequently repeat the selection and providing of one or more second sets of waveforms based on the corresponding priorities associated with each of the second sets of waveforms;
         analyze system performance with respect to each selected second set of waveforms previously emitted by the one or more antenna systems of the front end; and
         move a second set of waveforms from a lower priority queue of the plurality of queues to a higher priority queue having a different priority level based on the analysis of system performance.

2. The radar system of claim 1, wherein the logic further comprises instructions that, when executed by the processor, cause the processor to rank the second sets of waveforms assigned to each queue relative to other second sets of waveforms assigned to the queue.

3. The radar system of claim 2, wherein the logic further comprises instructions that, when executed by the processor, cause the processor to select a second set of waveforms for emission based on the second set of waveforms being assigned to a queue having a highest priority and the second set of waveforms having a highest rank in the queue with the highest priority.

4. The radar system of claim 3, wherein the logic further comprises instructions that, when executed by the processor, cause the processor to rank the second sets of waveforms assigned to a queue according to when the second sets of waveforms are received by the queue.

5. The radar system of claim 1, wherein the logic further comprises instructions that, when executed by the processor, cause the processor to designate a priority for each second set of waveforms of the plurality of second sets of waveforms when the second set of waveforms is generated.

6. The radar system of claim 5, wherein the logic further comprises instructions that, when executed by the processor, cause the processor to:
   determine a potential collision with an object based on the generated one or more parameters associated with the environment surrounding the vehicle;
   generate a second set of waveforms based on the determination of the potential collision;
   designate a highest priority for the generated second set of waveforms; and
   assign the generated second set of waveforms designated with the highest priority into a highest priority queue.

7. The radar system of claim 1, wherein the logic further comprises instructions that, when executed by the processor, cause the processor to:
   receive a third set of waveforms having a corresponding priority; and
   assign the third set of waveforms into a queue of the plurality of queues based on the corresponding priority of the third set of waveforms.

8. A method of scheduling radar scan patterns for a front end of a vehicle, the method comprising:
   providing a front end configured to detect one or more objects in an environment surrounding a vehicle with electromagnetic radiation, the front end comprising one or more antenna systems configured to emit and receive electromagnetic radiation;

receiving return signals by the one or more antenna systems in response to an emission of a first set of waveforms by the one or more antenna systems;

evaluating the return signals received by the one or more antenna systems;

generating one or more parameters associated with an environment surrounding the vehicle based on the evaluation of the return signals;

generating a plurality of second sets of waveforms based on the generated one or more parameters associated with the environment surrounding the vehicle, wherein each second set of waveforms of the plurality of second sets of waveforms is different from the first set of waveforms;

assigning each second set of waveforms of the plurality of second sets of waveforms into a queue of a plurality of queues based on a corresponding priority of the second set of waveforms, wherein each queue of the plurality of queues is associated with a different priority level;

selecting one or more second sets of waveforms from the plurality of second sets of waveforms based on corresponding priorities associated with each of the second sets of waveforms;

providing the selected second set of waveforms for emission by the one or more antenna systems of the front end;

subsequently repeating the selection and providing of one or more second sets of waveforms based on the corresponding priorities associated with each of the second sets of waveforms;

analyzing system performance with respect to each selected second set of waveforms previously emitted by the one or more antenna systems of the front end; and moving a second set of waveforms from a lower priority queue of the plurality of queues to a higher priority queue having a different priority level based on the analysis of system performance.

9. The method of claim 8, wherein assigning each second set of waveforms includes ranking the second sets of waveforms assigned to each queue relative to other second sets of waveforms assigned to the queue.

10. The method of claim 9, wherein selecting a second set of waveforms includes selecting the second set of waveforms for emission based on the second set of waveforms being assigned to a queue having a highest priority and the second set of waveforms having a highest rank in the queue with the highest priority.

11. The method of claim 10, wherein assigning each second set of waveforms into a queue includes ranking the second sets of waveforms assigned to the queue according to when the second sets of waveforms are received by the queue.

12. The method of claim 8, further comprising designating a priority for each second set of waveforms of the plurality of second sets of waveforms when the second set of waveforms is generated.

13. The method of claim 12, wherein: generating a plurality of second radar scan patterns includes:

determining a potential collision with an object based on the generated one or more parameters associated with the environment surrounding the vehicle;

generating a second set of waveforms based on the determination of the potential collision; and designating a highest priority for the generated second set of waveforms; and assigning each second set of waveforms into a queue includes assigning the generated second set of waveforms into a highest priority queue.

14. The method of claim 8, further comprising:

receiving a third set of waveforms having a corresponding priority; and assigning the third set of waveforms into a queue of the plurality of queues based on the corresponding priority of the third set of waveforms.

\* \* \* \* \*